United States Patent [19]

Lu et al.

[11] Patent Number: 4,904,083
[45] Date of Patent: Feb. 27, 1990

[54] PARTIALLY TRANSPARENT MIRROR FOR A RING LASER

[75] Inventors: Samuel Lu, Moorpark; Kevin D. Grobsky, Canyon Country, both of Calif.

[73] Assignee: Litton Systems, Inc., Woodland Hills, Calif.

[21] Appl. No.: 320,786

[22] Filed: Mar. 10, 1989

Related U.S. Application Data

[63] Continuation of Ser. No. 96,130, Sep. 11, 1987, abandoned.

[51] Int. Cl.$^4$ .............................................. G01C 19/64
[52] U.S. Cl. .................... 356/350; 350/164; 350/166
[58] Field of Search ................ 356/350; 350/164, 166, 350/600

[56] References Cited

U.S. PATENT DOCUMENTS

| | | |
|---|---|---|
| 3,382,758 | 5/1968 | Wang . |
| 3,637,294 | 1/1972 | Berthold ............................ 350/166 |
| 4,213,705 | 7/1980 | Sanders . |
| 4,309,075 | 1/1982 | Apfel et al. ......................... 350/164 |
| 4,747,666 | 5/1988 | Ishida ................................... 350/164 |

Primary Examiner—Vincent P. McGraw
Assistant Examiner—S. A. Turner
Attorney, Agent, or Firm—Poms, Smith, Lande & Rose

[57] ABSTRACT

Provided herein is a ring laser gyro system having a special and improved partially transparent output mirror which provides relatively undistorted circularly polarized coherent light beams to the photo detector and amplifier of the system from the laser cavity thereof. This improved mirror achieves its results by sandwiching a non-quarterwave stack between two quarterwave stacks of multi layer, all of which are coated on a Zerodur substate mirror. The improved mirror achieves nearly Zero phase retardation and a Tp/Ts ratio equal to one.

12 Claims, 2 Drawing Sheets

PARTIALLY TRANSPARENT MIRROR FOR A RING LASER

This is a continuation of co-pending application Ser. No. 07/096,130 filed on Sept. 11, 1987 and now abandoned.

FIELD OF THE INVENTION

This invention relates generally to ring laser gyros, and more particularly, to an improved partially transparent mirror for use in a ring laser gyro system.

BACKGROUND OF THE INVENTION

Ring Laser Gyros having two or more beams of coherent light propagated in opposite directions around the laser ring cavity are well known in the art. See, U.S. Pat. No. 3,382,758 issued May 14, 1968, entitled "Ring Laser Having Frequency Offsetting Means Inside Optical Path" by Wang. The Ring Laser Gyro is a device for measuring rotation about an axis by means of counter propagating coherent light beams which travel differing effective path lengths in the clockwise and counter clock wise directions. The Ring Laser typically consists of four mirrors (one partially transparent) arranged in a square or polygonal shape defining a laser cavity and one or more laser tubes inserted into the cavity to provide light amplification and a coherent light source. Once laser oscillation occurs in the system at resonant frequencies, the difference in the length of the pathways traversed by the counter propagating laser beams result in a difference or beat frequency which is sensed by a photodetector and amplified by an amplifier. The beat frequency is a result of optically heterodyning the counter propogating beams.

The prior art recognized the sensitivity of the ring laser to factors like the earth's magnetic field, the direction of propagation of the beams, and the ellipticity of the polarized light forming the beams when precise rotational measurement is needed. The prior art has attempted to eliminate sensitivity of the ring laser gyro to the magnetic field of the earth in U.S. Pat. No. 4,213,705, issued July 22, 1980 to Virgil Sanders, entitled "Four Mode Zeeman Laser Gyroscope With Minimum Hole Burning Competition."

Ideally a planar two mode ring laser gyro should have linearly polarized beams. Mirror birefringence, out-of-planeness, relative reflectivity of the mirror of perpendicular and parallel polarized light, and the Faraday effect are all factors which cause the gyro system to deviate from this ideal. Non-planar multimode ring laser gyro systems provide an output signals at the partially transparent mirror which combines circularly polarized laser beams. The output signals provided would yield a most accurate measurement if they could pass through this partially transparent mirror relatively undistorted.

SUMMARY OF THE INVENTION

It has been discovered that one of the parameters which, if changed, would improve the accuracy of the ring laser gyro system is an improved partially transmissive output mirror. The ideal mirror has a small or zero phase retardation and a low ratio between S-polarization and P-polarization transmissions, idealy equal to one. The transmission ratio is $T_p/T_s$, where $T_p$ is the P-polarized light transmitted and $T_s$ is the S-polarized light transmitted by the partially transparent mirror of the ring laser gyro system. The P-polarized light is the light which has its electrical field parallel to the plane of incidence. The S-polarized light has its electrical field perpendicular to the plane of incidence.

The specialized partially transparent mirror of this invention which achieves these goals comprises a mirror made with the following structure. The mirror comprises a substrate base, such as Zerodur ® (a low thermal expansion glass manufactured by Schoot Corporation of Maine, West Germany) which is coated with a first quarter wave stack of a plurality of layers. The plurality of layers are made from alternating quarterwave thick layers of $TiO_2$ (Titanium Oxide) and $SiO_2$ (Silicon Oxide). The $TiO_2$ layers are characterized by a relatively high refractive index n of 2.32, while the $SiO_2$ layers are of a relatively lower refractive index n of 1.46. By providing a quarterwave stack of alternating relatively high and relatively low refractive indices layers, the first quarterwave stack provides a highly reflective stack.

This quarterwave stack is, coated with a second non-quarterwave stack of a plurality of layers. As the term implies, these layers are of a thickness other than one-quarterwave ® length of the first stack. This second non-quarterwave stack set of coated layers provides a special interference effect which makes the $T_p/T_s$ ratio approach one and phase retardation near zero.

The second non-quarterwave stack is sandwiched between the first quarterwave stack already described and a third quarterwave stack, for adjusting mirror transmittance, of alternating high and low refractive materials ($TiO_2$ and $SiO_2$). This third quarterwave stack is covered by a double quarterwave protective layer of $SiO_2$.

The first and third quarterwave stacks each function to provide a highly reflective surface near the reference wave length (6328 A for a Helium Neon Laser), each quarterwave stack behaving as a rejection filter having a relatively low transmittance, where the $T_p/T_s$ ratio is high, around thirty for a 40° incident angle.

Since it is desirable to provide partial transmittance through the output mirror, ideally both phase retardation should be zero and the $T_p/T_s$ ratio should be one. This ideal is approached by the design of this invention, which requires that a non-quarterwave stack (preferably each layer being less than one-quarterwave length in thickness) be sandwiched between at least the two quarterwave stack layers. The special partially transparent mirror of this ring laser gyro is built by sandwiching a non-quarterwave stack between the quarterwave stacks to increase the S-polarization transmission and reduce the P-polarization transmission, therefore, the $T_p/T_s$ ratio can approach one.

DETAILED DESCRIPTION OF THE PREFERRED EMBODIMENT

Figure 1:
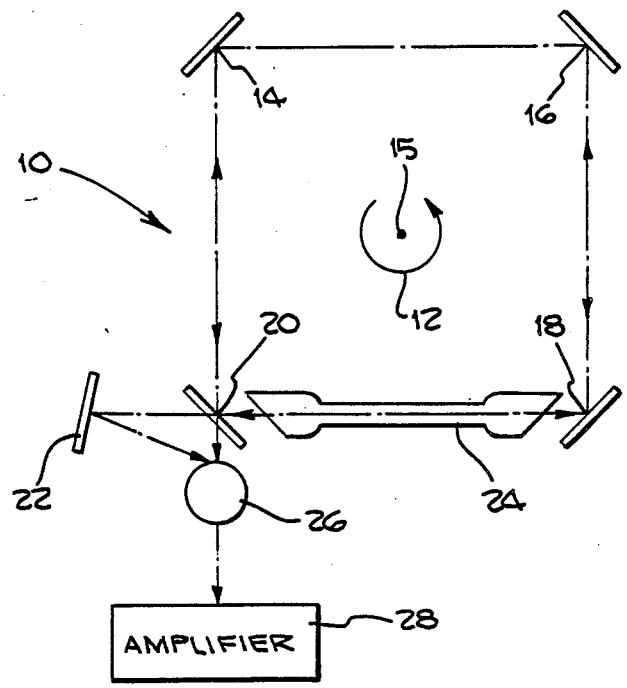
FIG. 1 shows a diagrammatic view of a ring laser gyro system which includes the special output partially transparent mirror 20.

With reference to FIG. 1, there is shown generally a ring laser gyro system 10 which is suitable for measuring the amount of angular rotation Omega (12) about the axis 15 which is perpendicular to the plane of the ring laser gyro system 10. The gas laser tube 24, in one embodiment of the ring laser gyro system 10, produces coherent light. The counter-clockwise directed coherent light beam is reflected first off mirror 18, and onto mirror 16 to mirror 14 and through the output mirror 20, This counter-clockwise laser beam is then detected by the photodetector 26 and provided to the amplifier 28. Meanwhile, a clockwise laser beam is initially reflected off the partially reflecting (partially transparent) output mirror 20 and onto reflecting mirror 14, followed by mirrors 16 and mirrors 18. A portion of this clockwise coherent light source laser beam is provided to the mirror 22 and then to the photodetector 26 in the amplifier 28, where the clockwise and counterclockwise rotating laser beams are compared and mixed.

The heterodyning of these counter rotating coherent light beams will produce a beat frequency which is measurable and representative of a small portion of a degree of arc of rotation experienced by the ring laser gyro system 10. This is evident from the fact that as one turns the ring laser gyro system in a counterclockwise direction 12 as shown, the counterclockwise coherent light beam follows a longer pathway to reach the output mirror 20 and the photodetector 26 than does the clockwise directed laser beam. The heterodyning of these two beams produces a beat frequency which may be interpreted to produce an accurate measurement of angular rotation. As discussed in some of the references cited in the Background of the Invention hereinabove, the ring laser gyro system has application for navigation and use in aircrafts, as well as those situations which entail the need for precise angular measurement. The partially transparent output mirror 20 is constructed to assure that the mirror 20 operates to minimally distort the circularly polarized laser lights which pass therethrough and onto the photo detector.

It can be seen that where precise measurements are needed, the ring laser gyro system 10 operates best where the partially transparent output mirror 20 allows the passage of coherent light to occur through its surface and to be reflected off the surface in such a manner that there is minimal distortion of the light beam signal.

Figure 2:
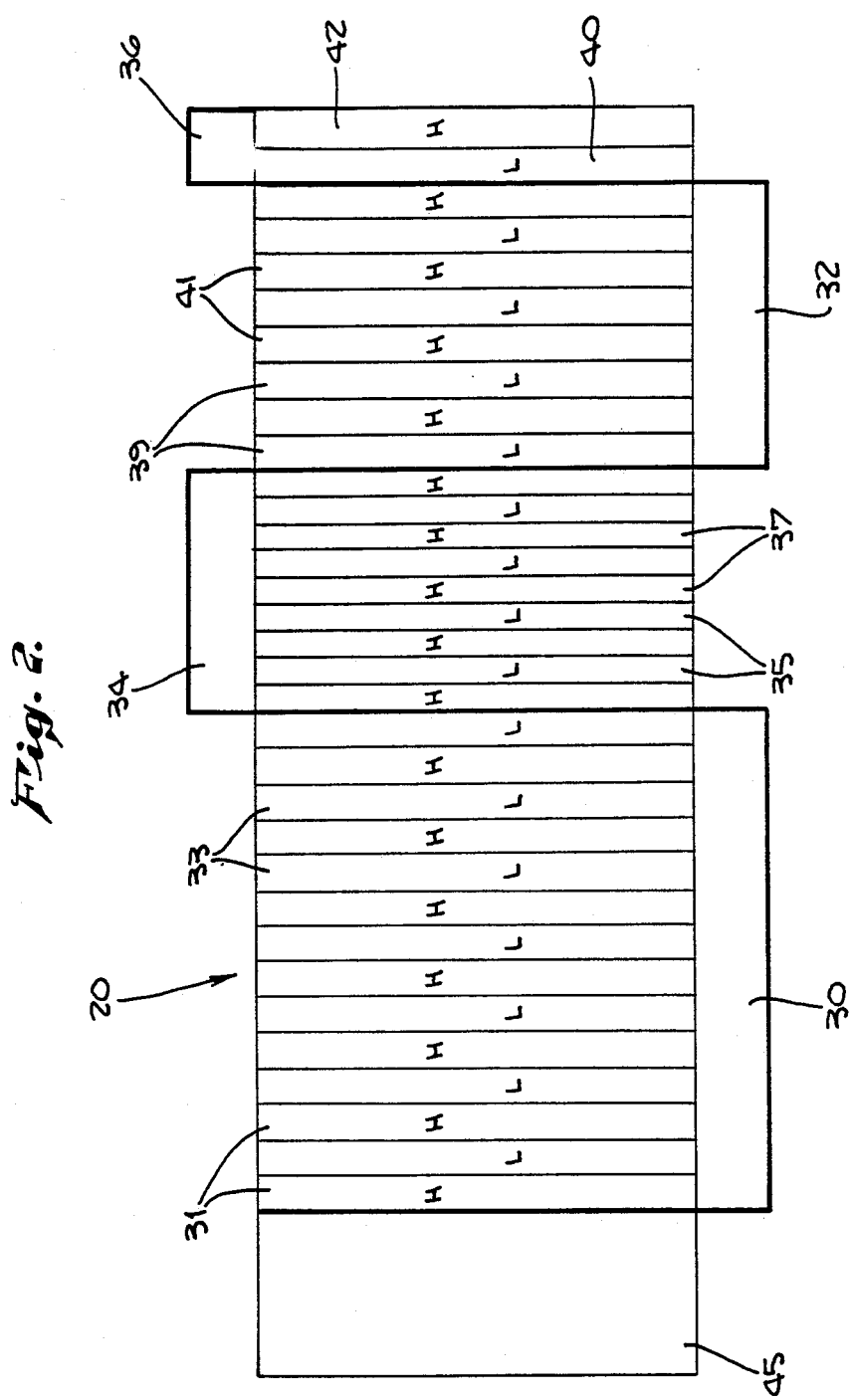
FIG. 2 is a block diagram which illustrates the manner in which the mirror 20 is constructed, with emphasis on the arrangement of the stacks.

As discussed in the Summary Of The Invention hereinbefore, a partially transparent output mirror such as 20 may best accomplish ideal characteristics when the mirror 20 is configured as shown in FIG. 2. The flat planer mirror may be made from dense 45, where the substate is preferably made from the material Zerodur ®. The Zerodur ® substate 45 is then coated by a quarterwave stack 30 which, in the preferred embodiment, is comprised of 14 layers of alternating high (H) index of refraction 31 and low (L) index of refraction 33 layers, stacked in an alternating manner and coated on top of the substate layer 45. Adjacent to quarterwave stack 30 is a second non- quarterwave stack 34, which in the preferred embodiment is made from alternating high (H) and low (L) indices of refraction layers 37 and 35, each of which are less than one quarterwave length of the preferred embodiment reference frequency $\lambda_0 0$, where $\lambda_0 0$ is 6328 Angstroms. In the preferred embodiment these alternating layers of high and low refractive materials (TiO$_2$ and SiO$_2$) are of thicknesses ranging from 0.624 to 0.868 of a quarterwave. The non-quarterwave stack 34 in the preferred embodiment comprises nine alternating layers of relatively high and low indices of refraction materials, by which stack 34 provides a special interface effect. The same materials are used in the quarterwave stacks 30 and 32. In the preferred embodiment, the high refractive index material used is TiO$_2$ (Titanium oxide) having an index of refraction (n) equal to 2.32. The low indices of refraction layers may be made from SiO$_2$ (Silicon oxide), having an index of refraction n =1.46.

The third quarterwave stack 32 in the preferred embodiment comprises 8 layers of alternating high 41 and low 39 indices of refraction for adjusting transmittance through the mirror 20. The entire composition is coated by a protective layer which comprises a double quarterwave stack 36 which comprises 2 layers (40 and 42) of SiO$_2$. In this manner, a partially transparent output mirror 20 is provided for use in the ring laser gyro system 10 (FIG. 1) which will achieve the desirable parameters.

It will be noted that a conventional output mirror of a 28 cm ring laser gyro, which has a quarterwave stack for purposes of providing a reflection, is characterized by a $T_p/T_s$ ratio of around 30 in a phase retardation near 0. This transmission ratio (Tp/Ts) is the ratio of the transmittance of P-polarized light to S-polarized light. By stacking a non-quarterwave stack 34 between 2 quarterwave stacks 30 and 32, the applicant achieves a substantially reduced Tp/Ts ratio (near 3) while achieving a phase retardation of 0.5 degrees and an average transmission (0.02%) of the mirror of 200 PPM (parts per million). Ideally, this is achieved at a 35 degree incident angle. The design can also be used for 30 and 40 degrees incident angle applications by preserving the optical thicknesses of the coatings at these angles.

Figure 3:
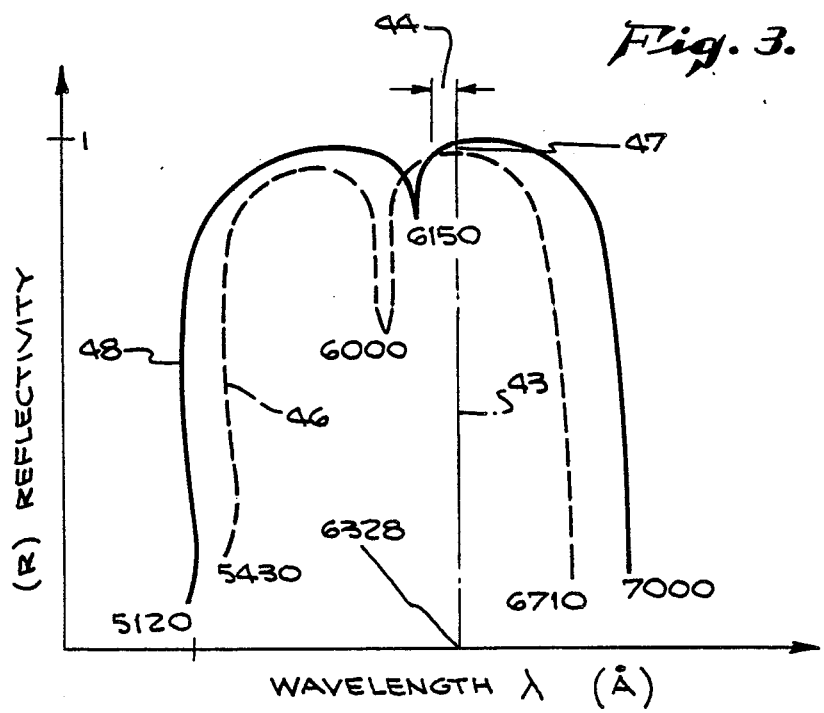
FIG. 3 is a diagram showing reflectivity (R) plotted against the wave length λ of the mirror 20.

FIG. 3 shows the manner in which the special output mirror 20 achieves the desired parameters. A graph is shown in FIG. 3, which plots Reflectivity (R) against Wavelength ($\lambda$); curve 46 shows the P-Polarization curve, and curve 48 shows the S-polarization curve for the mirror 20. At the desired wavelength $\lambda$ (measured in Å Angstroms), the subject invention achieves a slightly lower reflectivity to allow the transmittance of light undistorted through the output mirror 20, as shown on the curve over the range 44. The optimum wavelength is achieved along the dashed line 43, resulting in a reflectivity (R) at a point 47 where curves 46 and 48 almost coincide.

In this manner it can be seen that an improved ring laser gyro system is achievable which has a specially coated partially transparent output mirror 20 which both transmits and reflects the circularly polarized light produced within the ring laser gyro cavity and which is able to pass this light out to the photo detector 26 and amplifier 28 with little or no distortion, especially when compared with a conventional design output mirror 20.

The appended claims are directed to the preferred embodiment of this invention but are not intended to be limited to all the particular characteristics and parameters which are taught herein. For example, the particular number of layers used in each quarterwave and non-quarterwave stack depend on the materials used and may be modified and without undue experimentation achieve the same or equivalent results as the output mirror 20 of the ring laser gyro 10 taught herein achieves. Therefore, the appended claims should be construed to cover the preferred embodiment and alternative equivalent embodiments which properly fall within the scope of the claims.

What is claimed is:

1. A specialized partially transparent mirror for use in a multioscillator gyro operating at a predetermined wave length, comprising:
   a substrate;
   a first set of a plurality of layers coated upon said substrate, each layer of said first set having a thickness that is one quarter of said predetermined wavelengths;
   a second set of a plurality of layers coated upon said first set, each layer of said second set having a thickness other than one quarter of said predetermined wavelength;
   a second set of a plurality of layers coated upon said second set, each layer of said third set having a thickness that is one quarter of said predetermined wavelength; and
   said second and said third sets of a plurality of layers adjusted to establish said partially transparent mirror with an average transmission of 0.02% and a transmission ratio of P - polarized light to S - polarized light at near unity.

2. The specialized partially transparent mirror of a claim 1, wherein:
   said substrate is made from Zerodur material; and
   said mirror also comprises a protective layer made from layers of $SiO_2$.

3. The specialized partially transparent mirror of claim 1, wherein:
   said first and third sets of said plurality of layers comprise alternating layers of $TiO_2$ and $SiO_2$, each of said layers of a thickness other than one quarterwave; and
   said second set of a plurality of layers comprises alternating layers of $TiO_2$ and $SiO_2$, each of said layers of a thickness other than one quarterwave.

4. The specialized mirror of claim 1, wherein each layer of said second set has a thickness less than one quarterwave.

5. The specialized partially transparent mirror of claim 1, wherein:
   said first, second and third sets of layers are made from materials characterized by alternating indices of refraction.

6. The specialized partially transparent mirror of claim 1, wherein:
   said first set of a plurality of layers includes fourteen layers;
   said second set of plurality of layers includes nine layers;
   said third set of a plurality of layers includes eight layers;
   said transmission ratio is near unity; and
   said mirror has a phase retardation of near zero.

7. The specialized partially transparent mirror of claim 1, wherein:
   said substrate of said mirror is arranged for an angle of incidence of 30 to 40 degrees.

8. A system for minimizing the distortion of an output signal from a multioscillator laser gyro, comprising:
   a resonant laser cavity;
   means for propagating counter-rotating laser beams within said cavity;
   a plurality of mirrors mounted within said laser cavity for directing said laser beams within said laser cavity at an angle of incidence between 30° to 40°;
   at least one of said mirrors being partially transparent to allow the passage of said laser beams outside said cavity;
   said partially transparent mirror having:
   a substrate;
   a first set of plurality of layers positioned upon said substrate, each layer of said first set being a quarterwave length, said first set being a quarterwave stack;
   a second set of a plurality of layers positioned upon said first set, said second set being a non-quarterwave stack;
   a third set of a plurality of layers positioned upon said second set, each layer of said third set being a quarterwave length, said third set being a quarterwave stack; and
   said second set of a plurality of layers adjusted to establish said partially transparent mirror with a transmission ration of P — polarized light to S — polarized light at near unity.

9. The multioscillator laser gyro system of claim 8, wherein:
   said partially transparent mirror substrate is made from a transmission material such as Zerodur; and
   said partially transparent mirror has a protective coating made from layers of $SiO_2$.

10. The multioscillator laser gyro system of claim 9, wherein said layers of said first, second and third sets of said partially transparent mirror are made from alternating materials having respectively high and low indices of refraction.

11. The multioscillator laser gyro system of claim 10, wherein said materials having high indices of refraction include $TiO_2$ and said materials having low indices of refraction include $SiO_2$.

12. The multioscillator laser gyro system of claim 8, wherein:
    said layers of said second set of a plurality of layers have a thickness less than one quarterwave.

* * * * *